United States Patent [19] [11] 4,394,942
Yoshioka [45] Jul. 26, 1983

[54] AUTOMATIC APPARATUS FOR SUPPLYING A FIXED QUANTITY OF PARTICLE OR POWDER
[75] Inventor: Yoshitomo Yoshioka, Tokyo, Japan
[73] Assignee: K.K. Yoshioka Seisakusho, Tokyo, Japan
[21] Appl. No.: 244,861
[22] Filed: Mar. 17, 1981
[30] Foreign Application Priority Data
Jul. 11, 1980 [JP] Japan ............................ 55-093861
[51] Int. Cl.³ .................................................. G01F 11/10
[52] U.S. Cl. ....................................... 222/361; 222/354
[58] Field of Search ............... 221/263, 264; 222/216, 222/217, 225, 251, 252, 344, 305, 354, 355, 361, 362, 505, 42, 353, 63

[56] References Cited
U.S. PATENT DOCUMENTS
434,467 8/1890 Riley ................................. 222/354
3,904,081 9/1975 Mize ................................. 222/361

Primary Examiner—Charles A. Marmor
Assistant Examiner—Jan Koniarek
Attorney, Agent, or Firm—Frishauf, Holtz, Goodman and Woodward

[57] ABSTRACT

An automatic supplying apparatus for powder or particle materials which repeatedly transfers the material laterally in fixed quantities from a position directly below a hopper to a working table. The apparatus comprises a measuring transfer table having through holes of a predetermined configuration and capable of reciprocating along a track, and a gate moving integrally with the measuring transfer means to close the bottom of the through holes when the measuring transfer table proceeds towards the working table, and returning to the original position when it reaches a predetermined position on the working table, leaving the measuring transfer table behind and causing the bottom of the through holes to open at a predetermined position on the working table.

13 Claims, 7 Drawing Figures

FIG. I

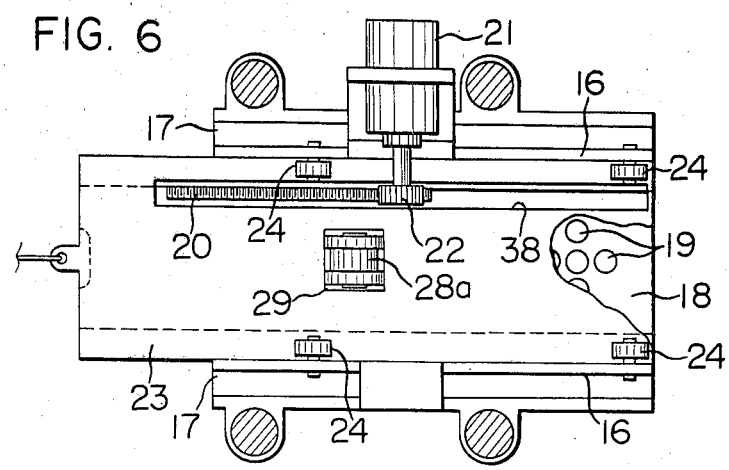
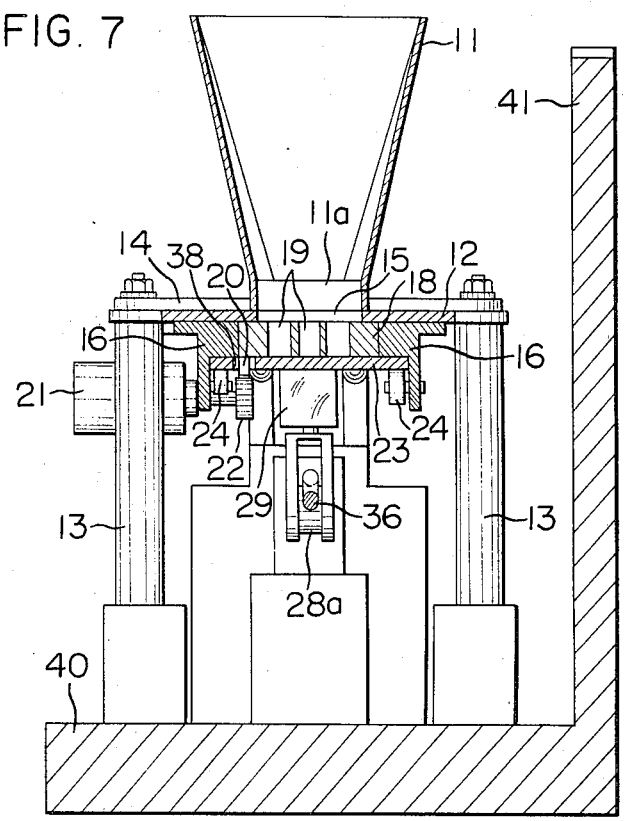

AUTOMATIC APPARATUS FOR SUPPLYING A FIXED QUANTITY OF PARTICLE OR POWDER

BACKGROUND OF THE INVENTION

The present invention relates to an automatic apparatus for repeatedly supplying fixed quantities of particles or powders contained in a hopper.

In the production of particle or powdered materials such as grain particles, grain flour, pharmaceutical powders and the like by press or heat press processes, it is necessary to place the press, the heat press and the other working machines directly above the working table. This renders it impossible to install the working table directly below the hopper outlet. This inevitably necessitates a lateral arrangement wherein the working table is installed at a distance from the outlet of the hopper, whereby the powdered or particle materials are transferred from the outlet to the working table. It is also necessary that the amount of the material to be supplied to the working table is constant in order to obtain products of a uniform shape and size.

SUMMARY OF THE INVENTION

It is therefore an object of the present invention to provide an apparatus for transferring particle or powdered materials in fixed amounts which automatically reciprocates between a position directly below the hopper outlet and a position directly above the working table.

Another object of the present invention is to provide a simple control mechanism for the driving motor in order to facilitate shifting of the reciprocation period of the automatic supply apparatus.

In an embodiment according to the present invention, the apparatus for conveying a fixed amount of powdered or particle materials contained in the hopper from a position directly below the hopper to a working table disposed away from said hopper in the horizontal direction comprises a measuring transfer means which is disposed in such a fashion as to be reciprocably movable along a given path to and from a predetermined position over the working table and an original position below the hopper; a measuring cavity means which comes to said predetermined position on the working table when the measuring transfer means moves to the farthest end of its reciprocating path, and comes to a position directly below the hopper outlet when the measuring transfer means returns to the original position and which has at least one vertical hole therein in a predetermined configuration; and a gate means provided below said transfer means and moving along with said transfer means with the bottom of said measuring cavity means closed when the transfer means moves toward the working table, and receding leaving the transfer means behind when the transfer means reaches its farthest end of the reciprocating path, thus opening the bottom of said measuring cavity means at the predetermined position over the working table.

In a more concrete embodiment of the present invention, said apparatus further includes a lock mechanism which locks the transfer means and the gate means while said transfer means moves forward; a cam mechanism which releases said lock mechanism when the transfer means reaches the farthest end; and a gate return mechanism which returns only the gate means to the original position when the lock mechanism is released.

The measuring transfer means comprises a main plate having predetermined thickness and which is driven to reciprocate. The main plate is provided with at least one through hole of a predetermined configuration to serve as a measuring cavity means. A bottom plate is provided beneath said main plate to function as the gate means having a knock-pin which fits in a recess on the main plate to function as the lock mechanism for the main plate and the bottom plate when the transfer means moves forward. Said cam mechanism comprises a fixed cam and a follower, said follower being engaged with said knock-pin to move forward together with the bottom plate. The fixed cam is shaped such that it displaces the follower when the bottom plate reaches the farthest end of the reciprocating path, whereby the knock-pin becomes disengaged from said recess in the main plate.

The gate return mechanism acts to force the bottom plate to move backward when the bottom plate and the main plate held by the knock-pin are released. A cable means with a weight hanging from one end is laterally connected to the rear end of the bottom plate via a wheel. The weight constantly pulls the bottom plate backward. A coiled spring or the like may also be used to give said pulling force.

Further, a plurality of stoppers are provided at arbitrary positions to stop the bottom plate and the main plate from receding at the returning positions of the reciprocating track, and preferably the stoppers are respectively provided with a cushion mechanism.

The automatic supply apparatus according to the present invention thus transfers laterally toward the working table a fixed amount of powdered or particle materials contained in the hopper and discharged from the outlet thereof. Having left a predetermined amount of the materials on the working table for processing, it then returns, thereby facilitating processing on the table etc. even when the working machine is positioned directly above the working table. The apparatus repeatedly transfers the materials in a fixed amount onto the working table after it has been cleared of the processed products, thereby automatically supplying the material in a fixed amount to the working table. These and other objects and construction features of the present invention will become more apparent by the description of the preferred embodiment with reference to the accompanying drawings.

BRIEF DESCRIPTION OF THE DRAWINGS

FIG. 6 is a view seen from the direction along the arrows at the line VI—VI in FIG. 2; and FIG. 7 is a view seen from the direction of the arrows at the line VII—VII in FIG. 2.

DESCRIPTION OF THE PREFERRED EMBODIMENT

Figure 1:
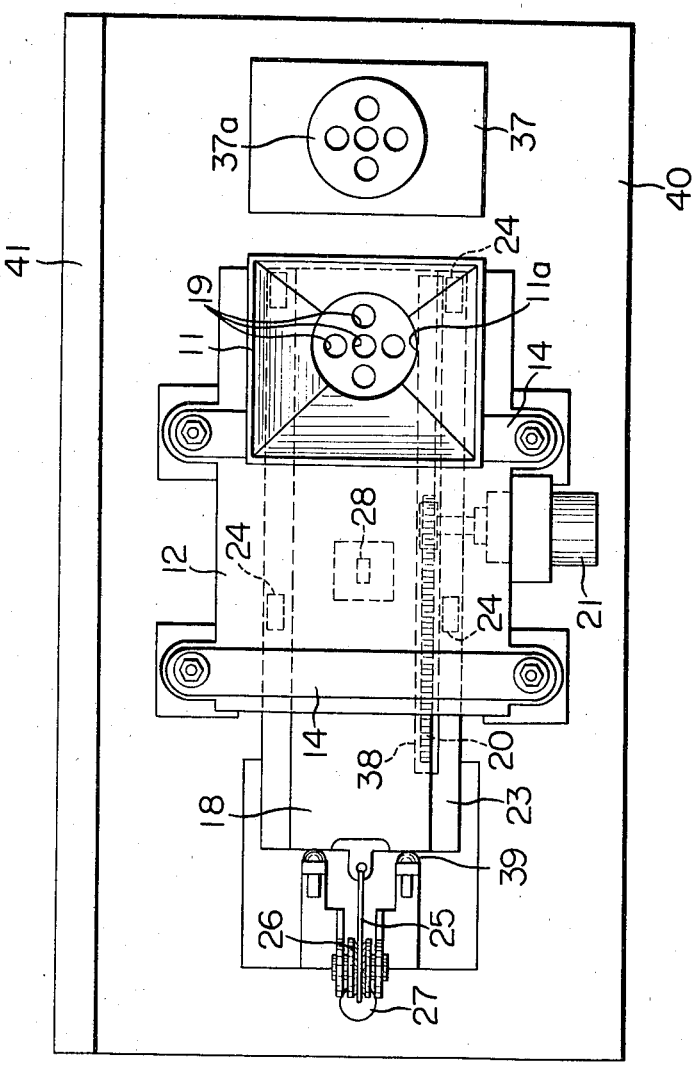
FIG. 1 is a plan view of the apparatus of the present invention.
Figure 2:
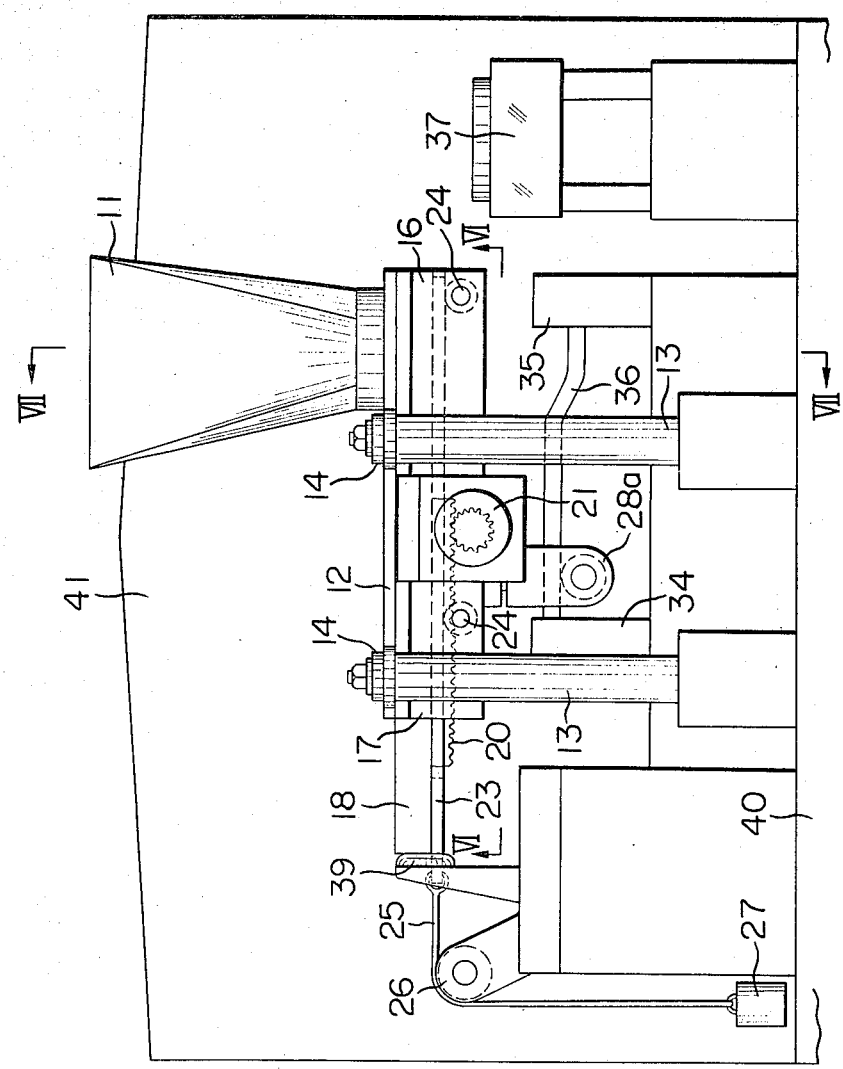
FIG. 2 is a front view of FIG. 1.

Referring to FIGS. 1, 2 and 7, the reference number 40 denotes a base and 41 a partition erected on the base 40. An upper plate 12 to which a hopper 11 is fixed is securely supported by four supports 13 erected on the base 40. Subplates 14, 14 are provided for reinforcement purposes. An opening 15 is provided in said upper plate 12 at a position corresponding to the outlet 11a provided at the lower part of the hopper 11. There are opposing side guide members 16, 16, and 17, 17 fixed at the front and rear sides respectively of the upper plate 12. A main plate 18 is provided between the side guide members 16, 16 and 17, 17 with its upper face abutting the lower surface of the upper plate 12 and slidable in the lateral directions of FIGS. 1 and 2. The lower face of the main plate 18 functions as the bottom plate 23 for closing the through holes 19 provided in the main plate 18 at its front portion (toward the working table 37 to be described hereunder) and penetrating throughout the thickness thereof. The bottom plate 23 is supported at both sides of the lower face of main plate 18 by support rollers 24 which are fixed to the side guide members 16, 16 and 17, 17. Said through holes 19 are provided at a position so as to come below the outlet 11a of the hopper 11 when the main plate 18 returns to the original position. A single or plural number of through holes 19 may be arbitrarily provided. A rack 20 is provided on the lower face of the main plate 18 either toward the front or the rear side with respect to the reciprocating track, said rack 20 being engaged with a pinion 22 which is coupled with a reversible motor 21. The reversible motor 21 is controlled in its timing for the normal and reverse rotations by a switching device (not shown) such as a microswitch, a limit switch and the like. To the rear end of the bottom plate 23 (at the opposite side of the working table) is fixed one end of a cable member 25 such as a chain, wire, rope and the like, which pulls the bottom plate 23 backwardly at all times by the weight 27 fixed at the other end of said cable member 25 via the pulley wheel 26.

Figure 3:
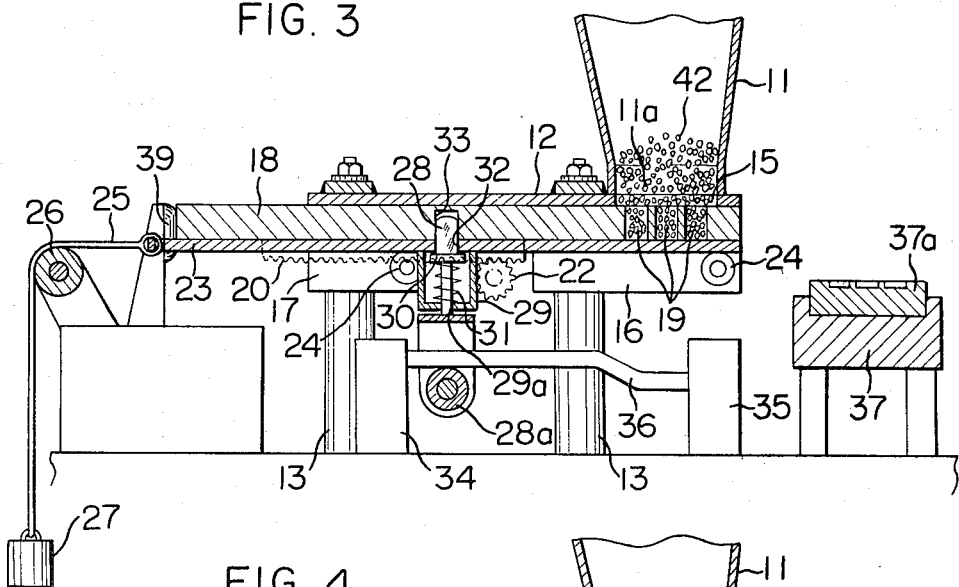
FIG. 3 is a vertical cross sectional view to show the relative positions of the main plate, the bottom plate and other relevant parts when the apparatus is located at the original position of its reciprocating track.
Figure 4:
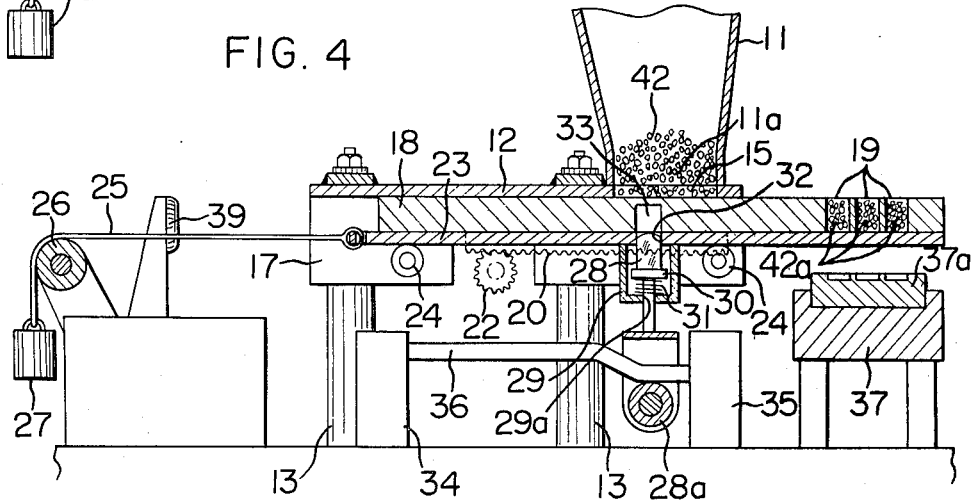
FIG. 4 is a vertical cross sectional view showing the apparatus at the farthest end of its reciprocating track.
Figure 5:
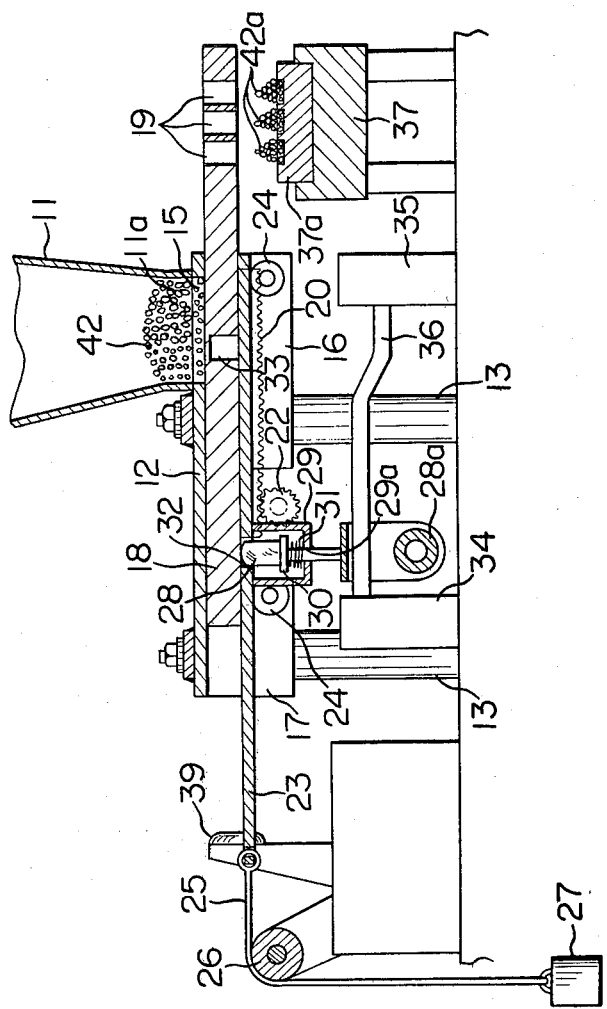
FIG. 5 is a similar vertical cross sectional view when the bottom plate alone is returned to the original position.

As best seen in FIGS. 3–5, a knock-case 29 is fixed on the lower face of the bottom plate 23. A coil spring 31 is interposed in the space between the knock-case 29 and a spring support 30 fixed to a knock-pin 28 to constantly force the knock-pin 28 upward, rendering the same to penetrate through the through hole 32 of the bottom plate 23. The upper tip of the knock-pin 28 fits into a recess 33 provided on the bottom face of the main plate 18, closing the through hole 19 of the main plate 18. Accordingly, the bottom plate 23 is locked with the main plate 18. The lower tip of the knock-pin 28 protruding from a lower through hole 29a of the knock-case 29 is attached to a follower 28a. Said follower 28a is connected to a fixed cam 36 which is laterally suspended between supports 34 and 35 in parallel to the reciprocating track of the plate 18. The supports 34 and 35 are erected on the base 40. The fixed cam 36 is inclined downward just below the working table 37 so that when the bottom plate 23 locked by the main plate 18 by means of the knock-pin 28 reaches the predetermined position on the working table, the follower 28a immediately slides down the cam 36, causing the knock-pin 28 to fall out of the recess 33 in the main plate 18.

The working table 37 is provided at the farthest end of the support 40 beyond the hopper 11 (or the farthest end of the reciprocating track of the main plate 18) with its upper face 37a being positioned below the lower face of the bottom plate 23. Reference number 39 denotes a stopper. The stopper 39 concurrently defines the position at which both the main plate 18 and the bottom plate 23 stop when they return and is provided with a cushion member at its end. An orifice 38 shown in FIGS. 6 and 7 is provided on the bottom plate 23 along the rack 20 of the main plate 18 for a distance substantially twice the entire length of the rack 20 and enables the bottom plate 23 to slide back alone, leaving the main plate 18 at the farthest end of the reciprocating track.

In the embodiment of the present invention, the particle or power material 42 (FIGS. 3–5) is charged in the hopper 11. The material 42 fills the through holes 19 of the main plate 18 having passed the outlet port 11a of the hopper 11 and the opening 15 of the hopper support 12. This is shown in FIG. 3 in which both the main plate 18 and the bottom plate 23 are at the original positions of the reciprocating track and locked by means of the knock-pin 28. The through holes 19 are positioned below the outlet port 11a of the hopper 11, and the bottom plate 23 covers the bottom of the through holes 19. In this state, the particle or powder material 42 filled in the through holes 19 is held by the bottom plate 33. The volume held in the bottom plate is determined by the size and depth of the through holes 19. The pinion 22, which is coupled to said motor, by the normal rotation of the reversible motor is engaged with the rack 20 provided at the back of the main plate 18 and drives the main plate 18 and the bottom plate 23 engaged with each other toward the working table 37 as shown in FIG. 4. When the through holes 19 of the main plate 18 come directly above the working table 37, the knock-pin 28 is forced down against the spring coil 31 to come out of the recess 33 in the bottom face of the main plate 18 as the follower 28a slides down to the lowest position on the fixed cam 36. As the bottom plate 23 is constantly pulled back by the weight 27, it returns to the original position as shown in FIG. 5 at the moment when said knock-pin is released out of the recess. The bottoms of the through holes 19 open at this moment, letting the particle or powder material 42a filled therein fall onto the top 37a of the working table 37. The reversible motor 21 then reverses its rotation, reversing the pinion 22 as well to bring the main plate 18 back to the original position by engagement with the rack 20. The through hole 32 in bottom plate 23 then comes in alignment with the recess 33 and the knock-pin 28 is pushed upward above said through hole 32 by the spring force of the coil spring 31 to become engaged in the recess 33, again interlocking the main plate 18 and the bottom plate 23 as shown in FIG. 3.

In the meantime, the power or particle material 42a is processed by a working machine etc. positioned above the working table 32 (not shown) to be lowered thereupon for pressing or heat pressing, and conveyed elsewhere before the main plate 18 and the bottom plate 23 proceed again to the working table 37. The reversible motor 20 which regulates the shuttle movement may be controlled by a switching means such as a microswitch, a limit switch and the like.

What is claimed is:

1. Apparatus for repeatedly and laterally transferring a predetermined amount of powdered or particle material contained in a fixedly located hopper having an outlet port to a fixedly located working table installed separately at a lateral distance from said hopper, comprising:

measuring transfer means provided below said hopper and which is reciprocably movable laterally from an original position below said hopper to a predetermined position above said working table, and laterally back to said original position below said hopper;

measuring cavity means including at least one through hole of a predetermined configuration provided vertically and penetratingly through said measuring transfer means such that said at least one through hole is located at a position above said working table when said measuring transfer means is at its predetermined position above said working table, and said at least one through hole is located at a position directly below said outlet port of said hopper when said measuring transfer means is at said original position below said hopper;

gate means provided beneath said measuring transfer means and which includes means for interlocking with said measuring transfer means to move with said measuring transfer means from its original position to its said predetermined position, said gate means including means for closing the bottom of said at least one through hole of said measuring cavity means during said movement from said original position to said predetermined position, said interlocking means including means for releasing said gate means from said measuring transfer means at said predetermined position, said gate means being slideable back to its original position when so released, thereby leaving the bottom of said at least one through hole open directly above said working table at said predetermined position;

said measuring transfer means comprising a main substantially horizontally arranged plate of a predetermined thickness reciprocably driven to reciprocate between said original and said predetermined positions along a given path;

said gate means comprising a bottom plate provided beneath said main plate and contacting the bottom of said main plate for closing the bottom of said at least one through hole during said movement from said original position to said predetermined position; and an upper plate substantially horizontally arranged above said main plate and having an opening therein in registration with said outlet port of said hopper and being in fixed position relative to said hopper;

said main plate having a solid portion which covers said opening in said upper plate during movement of said main plate between said original and predetermined positions, thereby maintaining said outlet port of said hopper in a closed condition during movement of said main plate; and said upper plate, said main plate and said bottom plate comprising a sandwich-type structure with said main plate interposed between said upper and bottom plates and being slidable in the horizontal direction relative to said upper and bottom plates.

2. The apparatus of claim 1, wherein:

said interlocking means of said gate means comprises a lock mechanism interlocking said measuring transfer means and said gate means while said measuring transfer means laterally moves from said original position to said predetermined position;

said releasing means of said interlocking means includes a cam mechanism coupled to said lock mechanism for releasing said lock mechanism when said gate means reaches said predetermined position; and said apparatus further includes a gate return mechanism coupled to said gate means for sliding said gate means back to said original position when said lock mechanism is released.

3. The apparatus of claim 2, wherein said lock mechanism comprises a knock-pin provided on said bottom plate for engaging said main plate to interlock said main plate and said bottom plate when said main plate moves from said original position to said predetermined position.

4. The apparatus of claim 3, wherein said cam mechanism comprises:

a fixed cam;

a follower engaged with said fixed cam, said follower being connected with said knock-pin to be moved together with said bottom plate; and said fixed cam displacing said follower when, during movement of said bottom plate from said original position to said predetermined position, said bottom plate reaches said predetermined position for releasing said knock-pin from engagement with said main plate.

5. The apparatus of claim 4, wherein said fixed cam comprises an elongated member having a cam surface and extending from substantially said original position to said predetermined position, said cam surface having an actuating portion in the vicinity of said predetermined position of said bottom plate.

6. The apparatus of claim 4, wherein said gate return mechanism includes a cable, a wheel and a weight coupled at one end of said bottom plate for pulling said bottom plate to return said bottom plate to said original position when said interlocking of said bottom plate and said main plate is released by means of said knock-pin being disengaged from said main plate.

7. The apparatus of claim 3, further comprising a stopper for stopping said bottom plate and said main plate at said original position of reciprocation thereof.

8. Apparatus for repeatedly and laterally transferring a predetermined amount of powdered or particle material contained in a fixedly located hopper having an outlet port to a fixedly located working table installed separately at a lateral distance from said hopper, comprising:

measuring transfer means provided below said hopper and which is reciprocably movable laterally from an original position below said hopper to a predetermined position above said working table, and laterally back to said original position below said hopper;

measuring cavity means including at least one through hole of a predetermined configuration provided vertically and penetratingly through said measuring transfer means such that said at least one through hole is located at a position above said working table when said measuring transfer means is at its predetermined position above said working table, and said at least one through hole is located at a position directly below said outlet port of said hopper when said measuring transfer means is at said original position below said hopper;

gate means provided beneath said measuring transfer means and which includes means for interlocking with said measuring transfer means to move with said measuring transfer means from its original position to its said predetermined position, said gate means including means for closing the bottom of said at least one through hole of said measuring cavity means during said movement from said original position to said predetermined position, said interlocking means including means for releasing said gate means from said measuring transfer means at said predetermined position, said gate means being slideable back to its original position when so released, thereby leaving the bottom of said at least one through hole open directly above said working table at said predetermined position;

said interlocking means of said gate means including:
- a lock mechanism interlocking said measuring transfer means and said gate means while said measuring transfer means laterally moves from said original position to said predetermined position; and
- said releasing means of said interlocking means including a cam mechanism coupled to said lock mechanism for releasing said lock mechanism when said gate means reaches said predetermined position; and said apparatus further includes a gate return mechanism coupled to said gate means for sliding said gate means back to said original position when said lock mechanism is released.

9. The apparatus of claim 8, wherein:

said measuring transfer means comprises a main substantially horizontally arranged plate of a predetermined thickness reciprocably driven to reciprocate between said original and said predetermined position along a given path;

said at least one through hole being provided in said main plate;

said gate means comprises a bottom plate provided beneath said main plate and contacting the bottom of said main plate for closing the bottom of said at least one through hole during movement from said original position to said predetermined position; and said interlocking means of said gate means including a knock-pin provided on said bottom plate for engaging said main plate for interlocking said main plate and said bottom plate when said main plate moves from said original position to said predetermined position along said given path.

10. The apparatus of claim 9, wherein said cam mechanism comprises:

a fixed cam;

a follow engaged with said fixed cam, said follower being connected with said knock-pin to be moved together with said bottom plate; and said fixed cam displacing said follower when, during movement of said bottom plate from said original position to said predetermined position, said bottom plate reaches said predetermined position for releasing said knock-pin from engagement with said main plate.

11. The apparatus of claim 10, wherein said fixed cam comprises an elongated member having a cam surface and extending from substantially said original position to said predetermined position, said cam surface having an actuating portion in the vicinity of said predetermined position of said bottom plate.

12. The apparatus of claim 10, wherein said gate return mechanism includes a cable, a wheel and a weight coupled at one end of said bottom plate for pulling said bottom plate to return said bottom plate to said original position when said interlocking of said bottom plate and said main plate is released by means of said knock-pin being disengaged from said main plate.

13. The apparatus of claim 10, further comprising a stopper for stopping said bottom plate and said main plate at said original position of reciprocation thereof.

* * * * *